United States Patent Office 3,281,247
Patented Oct. 25, 1966

3,281,247
PROCESS FOR PRODUCING MONOSODIUM GLUTAMATE
Guido M. Miescher, Terre Haute, Ind., assignor to Commercial Solvents Corporation, a corporation of Maryland
No Drawing. Filed Dec. 16, 1963, Ser. No. 330,552
21 Claims. (Cl. 99—9)

This application is a continuation-in-part of application Serial No. 87,098, filed February 6, 1961.

My invention relates to an improved process for making monosodium glutamate and a novel product obtained utilizing this process. It also relates to the provision of a dry non-sticky, free-flowing fermentation product.

Monosodium glutamate enhances desirable flavors in foods and also helps the retention of desirable flavors in preserved foods.

Production of monosodium glutamate has been accomplished by hydrolysis of vegetable protein, synthesis via chemical means, and by fermentation. All these processes form glutamic acid which is converted to monosodium glutamate.

The production of monosodium glutamate by synthesis via chemical means has the drawback of producing the racemic mixture DL-glutamic acid. This necessitates a difficult, expensive, and time consuming resolution step, since the desirable form of monosodium glutamate to enhance food flavor is L-monosodium glutamate only.

A more desirable method of making L-monosodium glutamate is from L-glutamic acid produced by fermentation. Some fermentation processes have the advantage of forming L-glutamic acid only. However, even when only L-glutamic acid is formed, there are still difficult, time consuming, and expensive problems encountered in the recovery of L-glutamic acid from the fermentation media.

No matter which of the above processes is used to make L-glutamic acid, great expense and time must be devoted to forming L-monosodium glutamate crystals from the L-glutamic acid. From the above it will be readily seen that crystalline L-monosodium glutamate is an expensive and time consuming material to manufacture. Because of this expense, its use as a food flavor enhancer has been limited to human consumption.

My invention is directed to the preparation of a fermentation product containing monosodium glutamate which is useful, for instance as an animal feed supplement, without the necessity of proceeding through the conventional difficult, time consuming and expensive recovery operations presently encountered in recovering glutamic acid from a fermentation medium and subsequently converting the glutamic acid to a form of monosodium glutamate which can then be utilized, for instance, as such a feed supplement. Nor is the provision of any fermentation product containing monosodium glutamate suitable for certain uses such as feed supplements since such fermentation products may also contain undersirable components, e.g., sodium sulfate or sodium chloride (as a result of using ammonium sulfate or ammonium chloride, respectively, as the nitrogen source in a fermentation medium) which preclude the use of the fermentation product containing such undesirable components and monosodium glutamate for certain uses. Such undesirable components can be produced when following, for instance, the teachings of Canadian Patent No. 588,846.

It is an object of my invention to make a monosodium glutamate product so inexpensively that it may be used as a flavoring enhancer in animal feeds.

It is a further object of my invention to provide a process for making monosodium glutamate very rapidly.

It is a further object of my invention to make monosodium glutamate by a one-step process, without first recovering glutamic acid.

It is a further object of my invention to provide a dry, non-sticky, free-flowing fermentation product from a hygroscopic fermentation beer.

These and other objects of my invention will become more apparent upon a fuller understanding of the invention as hereafter described.

My invention involves an improvement in the process for manufacturing monosodium glutamate via the fermentation method for the production of glutamic acid.

I surprisingly found that by utilizing ammonia, ammonium hydroxide or urea as a nitrogen source in combination with a pH-controller such as ammonia, ammonium hydroxide or urea and by adding sodium ions (e.g., in the form of sodium hydroxide) to the fermentation medium after a substantial amount of L-glutamic acid has been produced and during the latter stages of fermentation, a fermentation product containing monosodium glutamate in high amounts is produced which does not contain the above noted undesirable components and such product can be utilized directly as a feed supplement, for instance, without the necessity of proceeding through the conventional difficult, time consuming and expensive recovery procedures generally employed. The advantageous result produced in using a monosodium glutamate-containing fermentation product produced in accordance with the present invention is shown below, for instance, where pigs and lambs consumed more pig lamb feed containing the product of the present invention than the feed formulation without the product.

A particularly advantageous feature provided by the present invention resides in the utilization of a pH-controlling, nitrogen-providing material in the initial phases of the fermentaton and until substantial L-glutamic acid is produced before adding sodium ions to the medium. This insures a high accumulation of glutamic acid and a consequent high accumulation of monosodium glutamate in the resulting fermentation product. For instance, note below where the spray-dried product contained 50% monosodium glutamate.

Another advantageous feature of the invention resides in the fact that the same supply line to the fermenter can be used for the same nitrogen component (ammonia, ammonium hydroxide or urea) as both the nitrogen source and pH controller. Thus the economy in utilizing one line to the fermenter for both uses of the same nitrogen component can be realized.

In my process, I produce monosodium glutamate directly in the fermentation medium and recover it as a concentrated solution of monosodium glutamate which can be used in the same manner as crystalline monosodium glutamate. In other variations of my process, I can dry the whole fermentation mixture containing the monosodium glutamate, and produce a new composition which not only contains the desirable qualities of monosodium glutamate but also contains vitamins, minerals and proteinaceous material and has tasty qualities of its own which can be used as a condiment for many varieties of foods and also in feeds.

Very generally, my new process involves production of glutamic acid by fermentation and conversion of the glutamic acid produced in the fermentation medium to monosodium glutamate by adding sodium ions to the culture medium during the latter part of the fermentation. Generally the sodium ions can be added after a significant amount of the contemplated L-glutamic acid production is achieved, usually after about 50 percent and preferably after about 55 and up to about 70 percent or more of the contemplated glutamic acid production is achieved. I then recover the monosodium glutamate as a concentrate in solution or as a dry monosodium glutamate containing powder.

It will be readily seen that my invention applies to many fermentation processes for making glutamic acid. The process involves cultivation of a glutamic acid producing microorganism such as a *Brevibacterium divaricatum* (as described in copending applications Serial Nos. 854,998; 4,237; and 140,230, filed November 24, 1959; January 25, 1960; and September 25, 1961, respectively) and *Micrococcus glutamicus* (as described in Canadian Patent 588,846), etc., in a nutrient fermentation medium. The fermentation is carried out in a nutrient medium containing a carbohydrate or sugar-containing source, a nitrogen source, a growth stimulant source, minerals, and trace minerals. The fermentation is carried out at a prescribed temperature range and is maintained at a prescribed pH level, e.g., about 6 to 9. During the fermentation, it is very advantageous and convenient, in accordance with the present invention, to utilize ammonium hydroxide, urea or ammonia as a source of nitrogen, which the organism utilizes in forming L-glutamic acid, and at the same time as a means of controlling the pH of the fermentation. I have also found that I can produce L-monosodium glutamate in the fermentation medium, without any prior separation, recovery, or purification of L-glutamic acid by adding sodium hydroxide to the fermentation medium in the latter stages of the fermentation. In so doing I can advantageously substitute up to about 50%, for instance, of the ammonium hydroxide, urea or ammonia with sodium hydroxide. The sodium hydroxide is added as needed to maintain the required pH of the fermentation.

Not only can I substitute sodium hydroxide for a portion of the ammonium hydroxide, previously used, but I can also substitute sodium hydroxide for a portion of other previously used bases and/or nitrogen-providing materials such as urea and ammonia, in similar glutamic acid producing fermentations.

I do not intend to limit myself to the use of sodium hydroxide as the only source of sodium ion in the formation of monosodium glutamate. Other sources of sodium ions, such as sodium carbonate, sodium lactate, etc., can be used. I prefer to use sodium hydroxide since no interfering side products are formed. Also its ease of handling and inexpensive cost make it attractive to use.

Recovery of my L-monosodium glutamate product is by concentration. The concentration can be accomplished by evaporation. If desired, the steps of filtration and/or decolorization by charcoal or any other convenient means, can be introduced. The filtered product is a clear, dark, viscous liquid when not decolorized and becomes much lighter in color when decolorized. These products may be utilized in the same manner as crystalline L-monosodium glutamate.

A dry monosodium glutamate product can be obtained by spray drying the whole fermentation medium or by other convenient drying means. The resulting product is a light buff powder. Still another variation of my product is to make tablets or pellets from the above-mentioned powder. An advantageous method for pelletizing includes adding a sufficient amount of sugar e.g. glucose, to the powder to make it stick together and then add a sufficient amount of magnesium stearate to lubricate the sticky, powdery mixture and reduce its tendency to stick to the metal parts of pelletizing equipment usually employed in pelletizing operations. The resulting tablets or pellets are easy to handle and also provide a premeasured unit of monosodium glutamate in ready to use form.

The whole fermentation liquid product (also referred to as fermentation beer) may be difficult to dry since it tends to be slightly hygroscopic. Another aspect of the present invention involves the provision of a dry non-sticky, free-flowing fermentation product from a hygroscopic fermentation beer. In connection with this aspect, a non-hygroscopic, moisture-absorbent diluent material is advantageously added to the fermentation beer containing glutamic acid products, e.g., glutamic acid, monosodium glutamate and/or ammonium glutamate, in amounts sufficient to facilitate the drying, e.g., spray or drum-drying, of the beer. These amounts will generally be from about 10 to 50%, preferably 20 to 40%, based on the total dry solids content of the beer. Suitable non-hygroscopic, moisture-absorbent materials include starchy materials, limestone, and soybean material, e.g., soybean meal and soybean hulls, however, cornstarch is preferred.

It is understood that the examples given below are for the purpose of illustration only and that I am not bound to the specific ingredients or amounts thereof or to the specific operating conditions set out therein. However, I intend to include all equivalents obvious to the art.

*Example I*

A 25-liter fermenter was charged with 10 liters of the following medium:

| | |
|---|---|
| Glucose _____ g__ | 1,000 |
| Urea _____ g__ | 20 |
| $K_2HPO_4$ _____ g__ | 10 |
| $MgSO_4 \cdot 7H_2O$ _____ g__ | 5 |
| $FeSO_4$ _____ mg__ | 40 |
| Wheat bran extract [1] _____ ml__ | 400 |
| Water to make 10 liters. | |

[1] Made by filtering off the insolubles of 100 g. of wheat bran in 1,000 ml. of water which had been steamed for 30 minutes.

The above fermentation charge was adjusted to pH 7. This fermentation charge was sterilized for 10 minutes at 15 pounds pressure. It was then inoculated with a seed culture of *Brevibacterium divaricatum* NRRL B–2312. The fermentation was carried out at a temperature of 30° C. with aeration and mechanical agitation. Throughout the fermentation the medium was kept at pH 7 by adding 300 milliliters of an aqueous solution of ammonium hydroxide (containing 28% to 30% $NH_3$) as needed. When the 300 milliliters of the ammonium hydroxide solution were exhausted the fermentation was kept at the required pH by adding a 60% solution of sodium hydroxide in water. It was necesary to add 255 milliliters of the sodium hydroxide solution to keep the proper pH until the end of the fermentation. L-monosodium glutamate was produced in the amount of 41 grams per liter of culture blend calculated as free glutamic acid, or 47 grams of L-monosodium glutamate per liter. One portion of the fermentation mixture was filtered and the other portion was not filtered. Both portions were concentrated by the evaporation of water until they each contained 300 grams of L-monosodium glutamate per liter. The unfiltered portion was spray dried and produced a light buff colored powder. Part of this powder was compressed into tablets.

*Example II*

A fermentation was carried out as described in Example I above, with the exception that instead of adding 300 milliliters of a solution of ammonium hydroxide in water (containing 28% to 30% $NH_3$) 275 milliliters were added, and instead of adding 255 milliliters of a 60% solution of sodium hydroxide in water, 280 milliliters were added. L-monosodium glutamate was produced in substantially the same yields.

*Example III*

A fermentation was carried out as described in Example 1 above, with the exception that instead of adding 300 milliliters of a solution of ammonium hydroxide in water (containing 28% to 30% NH₃), 325 milliliters were added, and instead of adding 255 milliliters of a 60% solution of sodium hydroxide in water, 230 milliliters were added. L-monosodium glutamate was produced in substantially the same yields.

*Example IV*

A 25-liter fermenter was charged with 10 liters of the following medium:

Glucose _____ g__ 1,000
Urea _____ g__ 80
K₂HPO₄ _____ g__ 10
MgSO₄·7H₂O _____ g__ 5
FeSO₄ _____ mg__ 40
Wheat bran extract [1] _____ ml__ 400
Water to make 10 liters.

[1] Made by filtering off the insolubles of 100 g. of wheat bran in 1,000 ml. of water which had been steamed for 30 minutes.

The above fermentation charge was adjusted to pH 7. This fermentation charge was sterilized for 10 minutes at 15 pounds pressure. It was then inoculated with a seed culture containing L-glutamic acid producing strains of *Brevibacterium divaricatum* NRRL B–2311. The fermentation was carried out at a temperature of 30° C. with aeration and mechanical agitation. During the fermentation, 60 g. of urea were added, 20 g. each at a point 18, 24 and 30 hours from the start of the fermentation. After the 30th hour, the fermentation medium was maintained at pH 7 by adding a 60% solution of sodium hydroxide in water. It was necessary to add 255 milliliters of the sodium hydroxide solution to keep the proper pH until the end of the fermentation. L-monosodium glutamate was produced in yields equivalent to those of Example I. One portion of the fermentation mixture was filtered and the other portion was not filtered. Both portions were concentrated by the evaporation of water. The unfiltered portion of this concentrate was spray dried and produced a light buff colored powder. Part of this powder was compressed into tablets.

It is obvious that, although examples given are for a specific fermentaton involving a specific organism, my invention can be applied to other similar fermentations for the production of glutamic acid employing other organisms.

My novel product is useful as a flavor enhancer or acceptability inducer in animal feed. Part of the spray dried product manufactured by the process of Example I was added to lamb feed and it was found to produce a feed which was overwhelmingly more acceptable to lambs than an identical feed formulation that did not contain the product of my invention. The lambs, under free choice, consumed 117% more feed containing 0.5% of the spray-dried product of Example I than an identical formulation without the product of my invention.

Six lambs were randomly allotted into each of two pens and permitted free access to both the control ration and an identical ration to which was added 0.50% by weight of the spray-dried product derived by the process of Example I. The spray-dried product contained 50% monosodium glutamate. The position of the two feeders and feed contained therein was reversed at two-day intervals in an attempt to minimize the effect of location of the feeder upon feed intake. The following tables show the amount of feed consumed and the feed composition.

FEED CONSUMPTION TEST

| Lot | Number of Animals | Level of Monosodium Glutamate Containing Spray Dried Product, Percent | Total Feed Consumed, Pounds |
|---|---|---|---|
| 1_____ | 6 | 0 | 50.7 |
|  |  | 0.5 | 111.6 |
| 2_____ | 6 | 0 | 52.5 |
|  |  | 0.5 | 112.5 |
| Average_____ |  | 0 | 51.6 |
|  |  | 0.5 | 112.1 |

FEED COMPOSITION

Ground corn cobs _____ pounds__ 39.5
Ground corn _____ do____ 27.0
Alfalfa mean _____ do____ 20.0
Molasses, cane _____ do____ 5.0
Soybean meal, 44% _____ do____ 7.0
Dicalcium phosphate _____ grams__ 259
Limestone _____ do____ 113
Iodized salt _____ do____ 227
Vitamin A supplement 10,000/gm. ____ do____ 20
Vitamin D supplement 1,500/gm. ____ do____ 15
Trace minerals _____ do____ 45

*Example V*

A fermentation is carried out essentially as described in Example I above except that a seed culture of *Brevibacterium divaricatum* NRRL B–2620 is used instead of NRRL B–2312.

*Examples VI to XIII*

Fermentations are carried out essentially as described in Example I above except that the following combinations of nitrogen sources and pH-controller set forth below are substituted for the urea and ammonium hydroxide.

| Example | Nitrogen source | pH-controller |
|---|---|---|
| VI_____ | Urea_____ | Ammonia. |
| VII_____ | ___do_____ | Urea. |
| VIII_____ | Ammonia_____ | Ammonium hydroxide. |
| IX_____ | ___do_____ | Urea. |
| X_____ | ___do_____ | Ammonia. |
| XI_____ | Ammonium hydroxide__ | Ammonia. |
| XII_____ | ___do_____ | Urea. |
| XIII_____ | ___do_____ | Ammonium hydroxide. |

To further show the advantageous results produced when using a monosodium glutamate-containing product produced in accordance with the present invention, a spray dried product manufactured in essentially the same manner as described in Example I was incorporated in a pig feed composition designated composition B. Composition B was preferred by the pigs over an identical feed formulation used as a control, composition A, which did not contain the product of the present invention, and composition B was found to be even more acceptable to pigs than composition C which contained an equivalent amount of monosodium glutamate (MSG) in pure form.

In these tests, the pigs were randomly allotted and permitted free access to both composition B containing 0.3 percent by weight of MSG from a spray dried fermentation beer product produced in accordance with the present invention and composition A. These tests also involved a comparison of composition B and composition C which contained 0.3 percent by weight of pure MSG. The following tables show the amount of feed consumed and the feed composition for each of compositions A, B and C.

FEED CONSUMPTION TESTS

COMPOSITIONS A AND B

| Litter No. | Total Feed Intake (Percent of Total) | | | No. of Pigs | Initial Age, Days | Days on Test |
|---|---|---|---|---|---|---|
| | A (percent) | B (percent) | C (percent) | | | |
| 7 | 25.7 lbs. (13) | 178.4 lbs. (87) | 204.1 lbs. | 11 | 5 | 44 |
| 8 | 9.4 (5) | 176.8 (95) | 186.2 | 11 | 5 | 44 |
| 14 | 10.6 (6) | 155.5 (94) | 166.1 | 11 | 5 | 43 |
| Total | 45.7 lbs. (8) | 510.7 lbs. (92) | 556.4 lbs. | 33 | | |

COMPOSITIONS B AND C

| Litter No. | B (percent) | C (percent) | Total | No. of Pigs | Initial Age, Days | Days on Test |
|---|---|---|---|---|---|---|
| 10 | 68.8 lbs. (57) | 51.6 lbs. (43) | 120.4 lbs. | 9 | 5 | 44 |
| 11 | 89.8 (59) | 61.8 (41) | 151.6 | 9 | 5 | 44 |
| 13 | 110.3 (49) | 114.1 (51) | 224.4 | 9 | 5 | 44 |
| Total | 268.9 lbs. (54) | 227.5 lbs. (46) | 496.4 lbs. | 27 | | |

FEED COMPOSITION

| Composition | A | B | C |
|---|---|---|---|
| Ingredients: | | | |
| Ground yellow corn, lbs | 292.50 | 481.70 | 242.25 |
| Cane Sugar, lbs | 60.00 | 100.00 | 50.00 |
| Dried skimmilk, lbs | 15.00 | 25.00 | 12.50 |
| Soybean meal (50% CP), lbs | 138.90 | 231.50 | 115.75 |
| Dried whey, lbs | 60.00 | 100.00 | 50.00 |
| Limestone, lbs | 4.20 | 7.00 | 3.50 |
| Lard, lbs | 15.00 | 25.00 | 12.50 |
| Dicalcium phosphate, lbs | 5.70 | 9.50 | 4.75 |
| Iodized salt, lbs | 3.00 | 5.00 | 2.50 |
| Baciferm 10, lbs | 3.00 | 5.00 | 2.50 |
| Vitamin A supp. (10,000 IU/g.), grams | 150 | 250 | 125 |
| Vitamin D$_2$ supp. (4 MI/lb.), grams | 36 | 60 | 30 |
| BY 21, grams | 192 | 320 | 160 |
| Calcium pantothenate 32, grams | 36 | 60 | 30 |
| Niacin (50%), grams | 24 | 40 | 20 |
| Choline chloride (25%), grams | 138 | 230 | 115 |
| Proferm 12, grams | 450 | 750 | 375 |
| Santoquin, grams | 34.2 | 57 | 28.5 |
| Trace mineral mix (CCC), grams | 138 | 230 | 115 |
| Zinc oxide, grams | 34.2 | 57 | 28.5 |
| Monosodium glutamate (MSG), lbs | | | 1.50 |
| MSG Spray Dried Beer, lbs | | 5.8 | |
| Total, lbs | 600.0 | 1,000.0 | 500.0 |

The results show that MSG from the spray dried beer Composition B is preferred more than 11 times more than Composition A and is even more effective on the average than pure MSG in improving feed acceptance by the pigs.

Example XIV

This example illustrates an aspect of the present invention for facilitating the drying of hygroscopic fermentation medium. The process of Example I was essentially followed except during the recovery stage of the production process, the final pH of the fermentation beer was adjusted to pH 6.5 by the addition of sulfuric acid. Corn starch was added to the whole fermentation beer at approximately 30% of the total dry material in the beer to facilitate spray drying. The whole fermentation beer contained approximately 10% dry matter. The whole beer with added starch was then dried in a Bowen Laboratory Spray Drier at 235 to 250° C. inlet temperature. Outlet temperature of the spray drier was 130 to 145° C.

The finished spray dried product was analyzed for certain constituents. The following analyses were noted:

| | Percent |
|---|---|
| Crude protein | 43.3 |
| Moisture | 5.07 |
| Ether extract | 0.75 |
| Crude fiber | 0.38 |
| Ash | 20.5 |
| Nitrogen free extract (soluble carbohydrate) | 30.0 |
| Volatile NH$_3$ as N | 0.81 |
| Glutamic acid | 45.2 |
| Monosodium glutamate equivalent | 52.0 |
| Sodium | 8.9 |

Material prepared by this procedure was also analyzed for vitamin content and the results are given below:

| | | |
|---|---|---|
| P-aminobenzoic acid | micrograms/g | 6.36 |
| Folic acid | micrograms/g | 24.2 |
| Pyridoxine | micrograms/g | 15 |
| Niacin | micrograms/g | 55.5 |
| Inositol | micrograms/g | 0.575 |
| Pantothenic acid | micrograms/g | 56.3 |
| Biotin | millimicrograms/g | 60 |
| Thiamine | mg./100g | 0.12 |
| Ascorbic acid: | | |
|   Reduced | mg./100g | 67.2 |
|   Dehydro | mg./100g | 31.3 |
|   Total | mg./100g | 98.5 |

Examples XV to XVII

The process set forth in Example XIV is conducted in essentially the same manner except the diluent material set forth in the table below is substituted for cornstarch in the respective example.

| Example: | Diluent material |
|---|---|
| XV | limestone. |
| XVI | soybean meal. |
| XVII | soybean hulls. |

Now having described my invention, what I claim is:

1. A process for the production of a fermentation product containing the monosodium glutamate and L-glutamic acid which comprises cultivating a glutamic acid-producing microorganism in a nutrient medium containing an assimilable carbohydrate source and an assimilable nitrogen source selected from the group consisting of ammonia, ammonium hydroxide, and urea while maintaining the pH of the medium within the range of about 6 to 9 with a pH-controlling, nitrogen-providing material selected from the group consisting of ammonia, ammonium hydroxide and urea to produce an amount of L-glutamic acid, and after a substantial portion of the said amount of L-glutamic acid is produced adding sodium ions to the medium and continuing fermentation in sufficient quantity to produce a fermentation product containing monosodium glutamate.

2. The process of claim 1 wherein the microorganism is an L-glutamic acid-producing strain of *Brevibacterium divaricatum* and the source of the sodium ions is sodium hydroxide.

3. The process of claim 1 wherein the nitrogen source used in the medium is the same as the pH-controlling, nitrogen-providing material used to maintain the pH of the medium.

4. The process of claim 1 wherein the nitrogen source is urea and the nitrogen-providing material is ammonium hydroxide.

5. A process for the production of a fermentation product containing monosodium glutamate of L-glutamic acid which comprises cultivating an L-glutamic acid-producing strain of *Brevibacterium divaricatum* in a nutrient medium containing an assimilable carbohydrate source and an assimilable nitrogen source selected from the group consisting of ammonia, ammonium hydroxide and urea to produce an amount of L-glutamic acid, maintaining the pH of the medium within the range of about 6 to 9 by adding to the medium a pH-controlling, nitrogen-providing material selected from the group consisting of ammonia, ammonium hydroxide and urea and after from about 50 percent to about 70 percent of said amount of L-glutamic acid is produced adding sodium ions to the medium and continuing the fermentation in sufficient quantity to produce a fermentation product containing monosodium glutamate.

6. The process of claim 5 wherein the microorganism cultivated is *Brevibacterium divaricatum* selected from the group consisting of NRRL B–2311; NRRL B–2312; and NRRL B–2620.

7. The process of claim 5 wherein the addition of the nitrogen-providing material is discontinued and the source of sodium ions is sodium hydroxide, said sodium hydroxide being added in an amount to substitute for up to about 50% of the ammonium hydroxide used to maintain the pH during the fermentation.

8. A process for the production of a monosodium glutamate-containing fermentation product useful as a feed supplement which comprises cultivating a glutamic acid-producing microorganism in a nutrient medium containing an assimilable carbohydrate source and an assimilable nitrogen source selected from the group consisting of ammonia, ammonium hydroxide and urea while maintaining the pH of the medium within the range of about 6 to 9 by adding to the medium a pH-controlling, nitrogen-providing material selected from the group consisting of ammonia, ammonium hydroxide and urea to produce an amount of L-glutamic acid, adding sodium ions to the medium after a substantial portion of said amount of L-glutamic acid is produced and continuing fermentation in sufficient quantity to maintain the pH of the medium and from a fermentation product containing monosodium glutamate, and concentrating the resulting fermentation product containing monosodium glutamate to produce a monosodium glutamate-containing fermentation product useful as a feed supplement.

9. The process of claim 8 wherein the glutamic acid-producing microorganism is a *Brevibacterium divaricatum* and the source of the sodium ions is selected from the group consisting of sodium hydroxide, sodium carbonate and sodium lactate.

10. The process of claim 9 wherein the sodium ion source is sodium hydroxide.

11. The process of claim 10 wherein the concentrated monosodium glutamate-containing product is dried to provide a dry monosodium glutamate-containing concentrate.

12. The process of claim 10 wherein the nitrogen source is urea.

13. The process of claim 12 wherein the nitrogen-providing material is ammonium hydroxide.

14. The process of claim 12 wherein the nitrogen-providing material is urea.

15. The process of claim 13 wherein the addition of the nitrogen-providing material alone is discontinued after said portion of the L-glutamic acid is produced and a mixture of ammonium hydroxide and sodium hydroxide is added to maintain the pH during said continued fermentation, said sodium hydroxide being added in an amount to substitute for up to about 50% of the ammonium hydroxide required when used alone.

16. The process of claim 1 wherein the fermentation product containing monosodium glutamate is dried and the drying is facilitated by adding a non-hygroscopic, moisture-absorbent diluent material to the fermentation medium.

17. The process of claim 11 wherein the drying of the monosodium glutamate-containing product is facilitated by adding a non-hygroscopic, moisture-absorbent diluent material to the product.

18. The process of claim 17 wherein the diluent material is a starchy material and the product is spray-dried.

19. The process of claim 17 wherein the diluent material is a starchy material and the product is drum-dried.

20. The process of claim 1 wherein the microorganism is an L-glutamic acid-producing strain of *Brevibacterium divaricatum* and the source of the sodium ions is sodium carbonate.

21. The process of claim 1 wherein the microorganism is an L-glutamic acid-producing strain of *Brevibacterium divaricatum* and the source of the sodium ions is sodium lactate.

References Cited by the Examiner

UNITED STATES PATENTS

| | | | |
|---|---|---|---|
| Re. 24,707 | 9/1959 | Gillis | 99—2 |
| 2,758,027 | 8/1956 | Gillis | 99—2 |
| 2,912,331 | 11/1959 | Turner et al. | 99—2 |
| 2,978,383 | 4/1961 | Yamada | 195—47 |
| 2,978,384 | 4/1961 | Yamada | 195—47 |
| 3,003,925 | 10/1961 | Kinoshita et al. | 99—2 |

FOREIGN PATENTS 588,846 12/1959 Canada.

A. LOUIS MONACELL, *Primary Examiner.*

DANIEL J. DONOVAN, *Assistant Examiner.*